US006836756B1

(12) United States Patent
Gruber (10) Patent No.: US 6,836,756 B1
(45) Date of Patent: Dec. 28, 2004

(54) TIME SIMULATION TECHNIQUES TO DETERMINE NETWORK AVAILABILITY

(75) Inventor: John G. Gruber, Orleans (CA)

(73) Assignee: Nortel Networks Limited, St. Laurent (CA)

( * ) Notice: Subject to any disclaimer, the term of this patent is extended or adjusted under 35 U.S.C. 154(b) by 780 days.

(21) Appl. No.: 09/709,340

(22) Filed: Nov. 13, 2000

(51) Int. Cl.⁷ ............................................. G06F 17/50
(52) U.S. Cl. ........................... 703/19; 370/242; 714/4
(58) Field of Search ..................... 703/19; 379/14.01; 370/242; 714/4, 1, 43; 709/224

(56) References Cited

U.S. PATENT DOCUMENTS

| | | | | |
|---|---|---|---|---|
| 5,699,403 A | * | 12/1997 | Ronnen | 379/15.04 |
| 6,003,090 A | * | 12/1999 | Puranik et al. | 709/235 |
| 6,009,079 A | * | 12/1999 | Boye et al. | 370/242 |
| 6,327,669 B1 | * | 12/2001 | Croslin | 714/4 |

FOREIGN PATENT DOCUMENTS

GB 234722 * 4/2000 ........... G01R/31/00

* cited by examiner

Primary Examiner—Albert W. Paladini (57) ABSTRACT

A time simulation technique for determining the service availability (or unavailability) of end to and network connections (or paths) between source and sink nodes is disclosed. The method includes skips of (a) selecting a link between two network nodes; (b) performing a simulated link failure on the selected link; (c) sell sting a connection bet two network source and sink nodes; and (d) determining the unavailability and availability of the connection on under the simulated link failure condition. The method further includes (e) of repeating (c) and (a) and (b); and (f) of summoning the unavailability and availability of connections after each repetition until a predetermined number of connections have been selected, and until a simulated link failure has been performed on all links; or until the summed unavailability and availability has been determined to converge, whichever is earlier.

9 Claims, 7 Drawing Sheets

Network Attributes - total:
- nodes (N)
- links (L)
- connections (C)
- link distance (TD)

Per Node Attributes:
(when included in availability simulation)
- no. connecting links
- which connecting links (i)
- selection criteria for failure
- failure data (FITs, MTTF,
- TTF selection criteria & distribution)
- recovery data, if applicable (mechanism, TTRc)
- repair data (MTTRp,
- TTRp selection criteria & distribution)

Per Link Attributes:
- which connecting nodes
- distance (dit)
- selection criteria for failure
- failure data (F, MTTF,
- TTF selection criteria & distribution)
- recovery data, if applicable (mechanism, TTRc)
- repair data (MTTRp,
- TTRp selection criteria & distribution)

Per Connection Attributes:
- which source (A) & sink (Z) nodes
- no. intermediate nodes
- which intermediate nodes
- which links in connection (j)
- total distance (CD)
- recovery data, if applicable (mechanism, TTRc)

*Fig 12*

TIME SIMULATION TECHNIQUES TO DETERMINE NETWORK AVAILABILITY

FIELD OF INVENTION

The invention is in the area of communications network analysis. In particular, it is directed to simulation techniques for analyzing the availability or unavailability of end-to-end network connections or services.

BACKGROUND OF THE INVENTION

Capacity planning is an important function in designing and provisioning, communication networks. While network link and node capacities have been estimated for years, there has been relatively little study of availability, especially for large mesh network. Large mesh networks with multiple nodes and links and with arbitary topology, are not very attainable to an exact analysis, especially for multiple failures. The multiple failure case means that by the time another failure occurs, repair processes for at least one previous failure have not completed, so that there may be more than one failure to deal with at any one time. Simple structured point-to-point or ring networks, for example, may have 1+1 or ring protection mechanisms for single failures, e.g., a single fiber cut at a time. The single failure case means that by the time a second failure occurs, repair processes for the first failure have completed so that there is no more than one failure to deal with at any one time. In typically route or geographically constrained networks of this kind, analytical and approximate techniques can give insight and understanding of service availability for each of any possible single failure. If, however, the network is unstructured like a mesh, if the number of nodes is large, and if multiple failures ate considered, the calculations, even if approximate, quickly become very complicated.

An article entitled "Computational and Design Studies on the Unavailability of Mesh-restorable Networks." by Matthieu Cloqueuer and Wayne D. Grover on Proceedings of DRCN '2000, April 2000, Munich describes computational techniques of unavailability of a mesh network for single and multiple (mainly two) failures As mentioned the above article, network availability generally refers to the ability of specific paths (also called connections) and not that of a whole network. Networks as a whole are never entirely up nor entirely down. "Network availability" can be defined as the average availability of all connections in a network but this gives less insight and comparative value than working with individual paths, or perhaps a selection of characteristic reference paths. Therefore, service availability between source and sink nodes is more meaningful to communications users who pay for such services.

Figure 1:
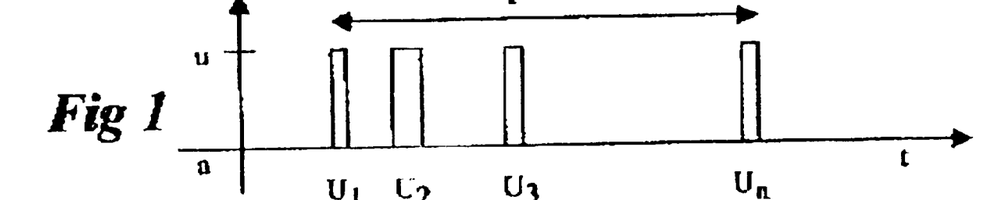
FIG. 1 is a time-related graph in which periods of unavailable service are shown.

For a quantitative study of network availability, FIG. 1 illustrates service on a specific path as down (unavailable) in durations U1, U2, U3, . . . Un along the time axis. On the vertical axis (U-unavailability), 'u' indicates the service as unavailable, and 'a' as available. Service availability over a period T is the fraction of this period during which the service is up. The availability and unavailability of the network (or service) therefore are defined as follows:

Availability=lim $((T-\Sigma UI)/T)$=MTTF/(MTTR+MTTF)

Unavailability=1−Availabity−MTTR/(MTTR+MTTF)

Where, MTTR is the mean time to recover or repair, and MTTF is the mean time to failure. Recovery is by relatively fast means of network protection (in tens of milliseconds) or restoration (perhaps within a second) capabilities, whereas repair is much longer (typically hours).

The above referenced article discusses computational approaches for analyzing availability under a two-failure scenario. Such approaches are quite complex.

There is need for faster and easier techniques to determine service availability, especially in large mesh networks. Simulation provides tractability for large networks, and is also a good check on accuracy of simple, approximate or analytical methods. Thus, the time simulation technique is a relatively easier and faster process that complements more insightful analytical approaches to availability.

SUMMARY OF INVENTION

According to the basic concept, the present invention is a time simulation technique for determining the service availability (or unavailability) of end-to-end network connections (or paths) between source and sink nodes. In accordance with one aspect, the invention is directed to a simulation technique to determine either the network availability or unavailability.

In accordance with one aspect, the invention is directed to a time simulation method of determining service availability of a communications network having a plurality of nodes and a plurality of links. The same principles can be applied to mesh networks or to other networks, such as ring networks. The method includes steps of: (a) selecting a link between two network nodes; (b) performing a simulated link failure on the selected link; (c) selecting a connection between two network source and sink nodes; and (d) determining the unavailability and availability of the connection under the simulated link failure condition. The method further includes (e) of repeating (c) and (a) and (b); and (f) of summing the unavailability and availability of connections after each repeatedly until a predetermined number of connections have been selected, and until a simulated link failure has been performed on all links or until the summed unavailability and availability has been determined to converse, whichever is earlier, (A convergence process may be used, for example, if an operator deems there to be too many failure scenarios to consider exhaustively, or it is too time consuming to consider all failure scenarios exhaustively.) The predetermined number of connections of step (f) may be all connection or a predetermined subset of connections.

In accordance with a further aspect, of the invention is directed to a time simulation apparatus for determining service availability of a mesh or other communications network. The apparatus includes a network having a plurality of nodes and a plurality of links; the links having attributes relating to their failure, recovery and repair mechanisms. The apparatus further includes a mechanism for selecting one of the plurality of links based on the attributes; a failure/repair module for performing a simulated failure and repair on the selected link; a mechanism for selecting a connection between source and sink nodes; and an arithmetic mechanism for calculating availability of the selected connection.

Other aspects and advantages of the invention, as well as the structure and operation of various embodiments of the invention will become apparent to those ordinarily skilled in the art upon review of the following description of the invention in conjunction with the accompanying drawings.

BRIEF DESCRIPTION OF DRAWINGS

Embodiments of the invention will be described with reference to the accompanying drawings, wherein.

DETAILED DESCRIPTION OF PREFERRED EMBODIMENTS OF INVENTION

Figure 2:
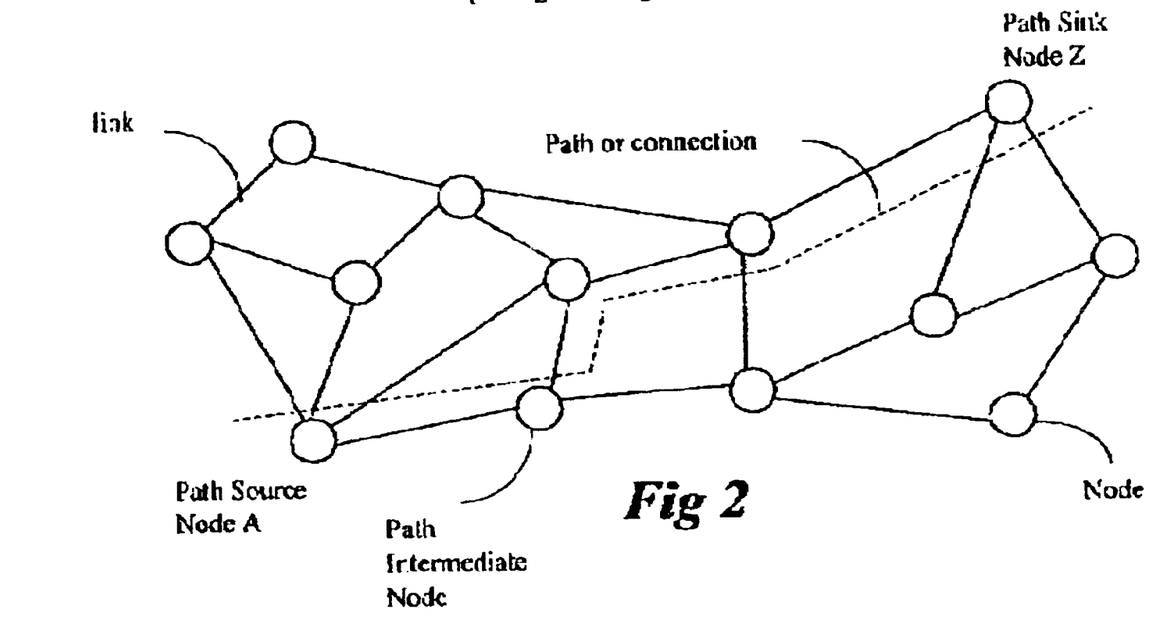
FIG. 2 shows a meshed network with links and nodes, also showing a path or connection between source node A and sink node Z.

Referring to FIG. 2, a network has A plurality of node; and links. The present invention considers the service availability between specific source and sink nodes. The service availability (unavailability) of a connection depends on not only the availability of each link in the connection, but also that of all other links, because failure of any link may affect the availability of the connection under consideration—that is, other failed links may prevent successful recover (protection or restoration) of the connection.

In FIG. 2, it is assumed that connections are already provisioned. The problem therefore can be stated as follows.

There are N nodes and L links in the network, each link having length di. There are C possible connections between source-sink node pairs of type A and Z, each connection using 1j links. The connection distance CD is the sum of di's over 1j links per connection. The total network link distance TD is the sum of di's over L network links.

The simulation goal is to determine how the link failure process affects the connection availability between nodes A and Z. As mentioned earlier, the availability it defined as:

Connection unavailability=U=MTTR/(MTTF+MTTR),

Connection availability-1-U-MTTF/(MTTF+MTTR),

Where, MTTF is an average failure rate of F fiber cuts/(1000 km*year) and MTTR is either MTTRc (recovery time for effective protection/restoration) or MTTRp (repair time for no, or ineffective, protection/restoration). Recovery indicates protection or restoration, and restoration implies any reasonable routing algorithm e.g., least cost, shortest path, etc., per operator preference.

Some examples are as follows:

If F-2 fiber cuts/(1000 km*year) and distance D=5000 km, MTTF=1000/(2*5000)=0.1 years=36.5 days.

For the same link as above, if 50 ms is needed for effective protection;
U-[0.05/(3600*24)]/[36.5+0.05/(3600*24)]=<0.000002%;
A=1-U⇒99.999998%~8 nines.

For the same link as above, if 500 ms is needed for effective restoration; U=[0.5/3600*24]/[36.5+0.5/(3600*24)]=<0.00002%;
A=1-U⇒99.99998%~7 nines.

For the same link as above, if 8 hours is needed for repair under no or ineffective protection/restoration;
U=8/24)/(36.54+8/24)=<0.9%;
A=1-U⇒99.1%~2 nines.

Figure 3:
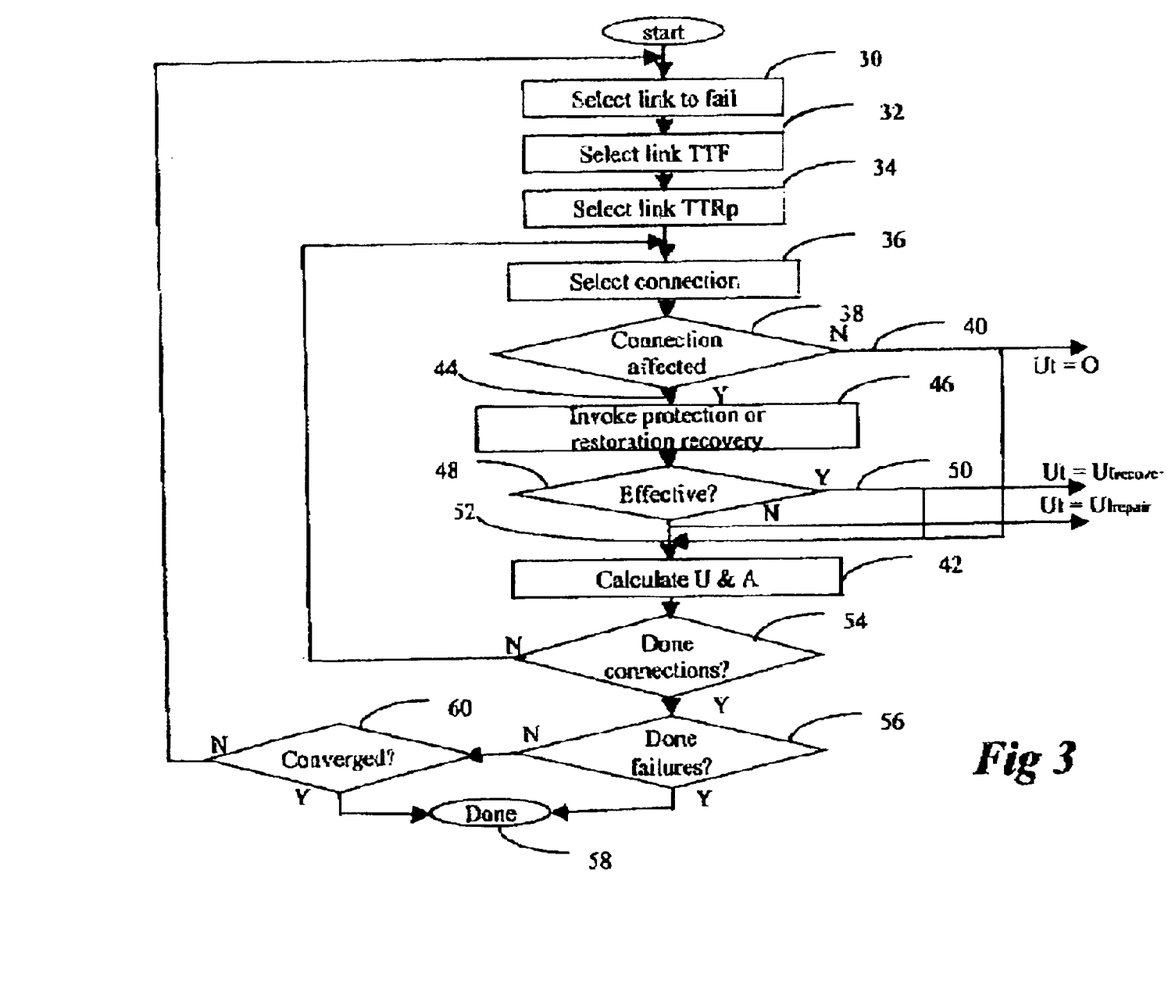
FIG. 3 is a flow diagram of the simulation technique according to one embodiment of the in invention.

FIG. 3 is a flow diagram of the algorithm according to one embodiment of the invention. It is assumed that only link failures (F fiber cuts/1000 km per year) occur, since they tend to have a dominant effect on availability. Furthermore, only singe link failure are considered in FIG. 3—multiple link failure are considered later. Node failures arm not specifically considered here but can be emulated by considering that all links emanating from a node fail simultaneously—a particular multiple failure scenario. Referring to FIG. 3, the simulation algorithm for the network under discussion runs as follows:

(1) At 30, randomly select a network link i to fall ("distance weighted" as described later);

(2) At 32, randomly fail selected network link i based on its TTF density distribution (distance dependent as described later);

(3) At 34, randomly select time to repair (TTRp) based on its TTRp density (as described later). (Note that one can also select times to recover (TTRc) based on TTRc densities. But these times tend to be quite small and less variable compared to repair times. So, here these times are fixed. e.g., at 50 ms for protection, or e.g. at 500 ms, for restoration.)

(4) At 36, select a connection (connection selection can be, e.g. sequential, random or be based on priority, as discussed later);

(5) At 38, decide if the selected connection is affected or not by the link failure in (2) above;

(6) At 40, if the connection is unaffected, accumulate 0 (unavailable time Ut=0) for this failure on thia connection, and proceed with cumulative calculation of connection U and A (unavailability and availability) at 42 (cumulating will begin for subsequent failures);

(7) At 44, if the connection is affected, invoke the failure recover scheme at 46 to determine whether or not the failure recovery scheme is effective at 48;

At 50, if effective, accumulate unavailable time Ut=Utrecover for this affected connection and calculate cumulative connection U and A at 40;

At 52, if ineffective, accumulate unavailable time Ut=Utropair for this affected connection and calculate cumulative connection U and at 40; (Note, the failure recovery scheme will be by means of separate processes for either protection or restoration, related to the capacity planing process for allocating protection or restoration bandwidth, and for switching links or rerouting connections over is bandwidth to avoid failures.)

(8) At 54, if not all the connections have been selected, go hack to 36 to repeat for all connections (or for any subset, per operator preference), continue to calculate Ut (Ut=0, or Utrecover, or Utrepair, as applicable) for each connection and calculate cumulative connection U and A at 42;

(9) At 56, determined if all links (or sufficient links, or specified links, per operator preference) have been selected to fail at least once (or more often, per operator preference);

if yes, end at 58;

if no, determine if A (and because of the equation U=1−A, also U) converges to a constant value, (e.g., per operator preference and to save simulation time, if U and A are changing so little after simulating an additional link, or are already adequate enough to not warrant further simulation), by convergence to a constant value, it is meant that the availability remains substantially the same after an additional simulation including an additional link;

(10) At 60, if A converges to a constant end at 58;

if no, go back to 30 to select another link to fail and repeat the procedure to continue for all failure combinations or until convergence.

Link Selection

Per operator preference there may be many ways to select a link to fail, e.g., sequentially, randomly, all, or selected subset from experience, etc. However, based on the characteristics of F fiber cuts/(1000 km*year), a longer link is more likely to fail, so, as one example, the link distance (di) weighted probability is introduced here to select a link to fail. The selection probability di/TD (the ratio of link distance di, to total network link distance TD). At 30 in FIG. 3, links will be selected according to these probabilities. In this way, longer links get selected with correspondingly higher probability. For example, if one link has twice the distance of another, the probability that that link is selected is twice that of the other.

Per operator preference, selection could be with replacement (since the same link can fail more than once), or without replacement (e.g., to speed simulation time and/or to have more links covered).

Figures 4, 5, 6:
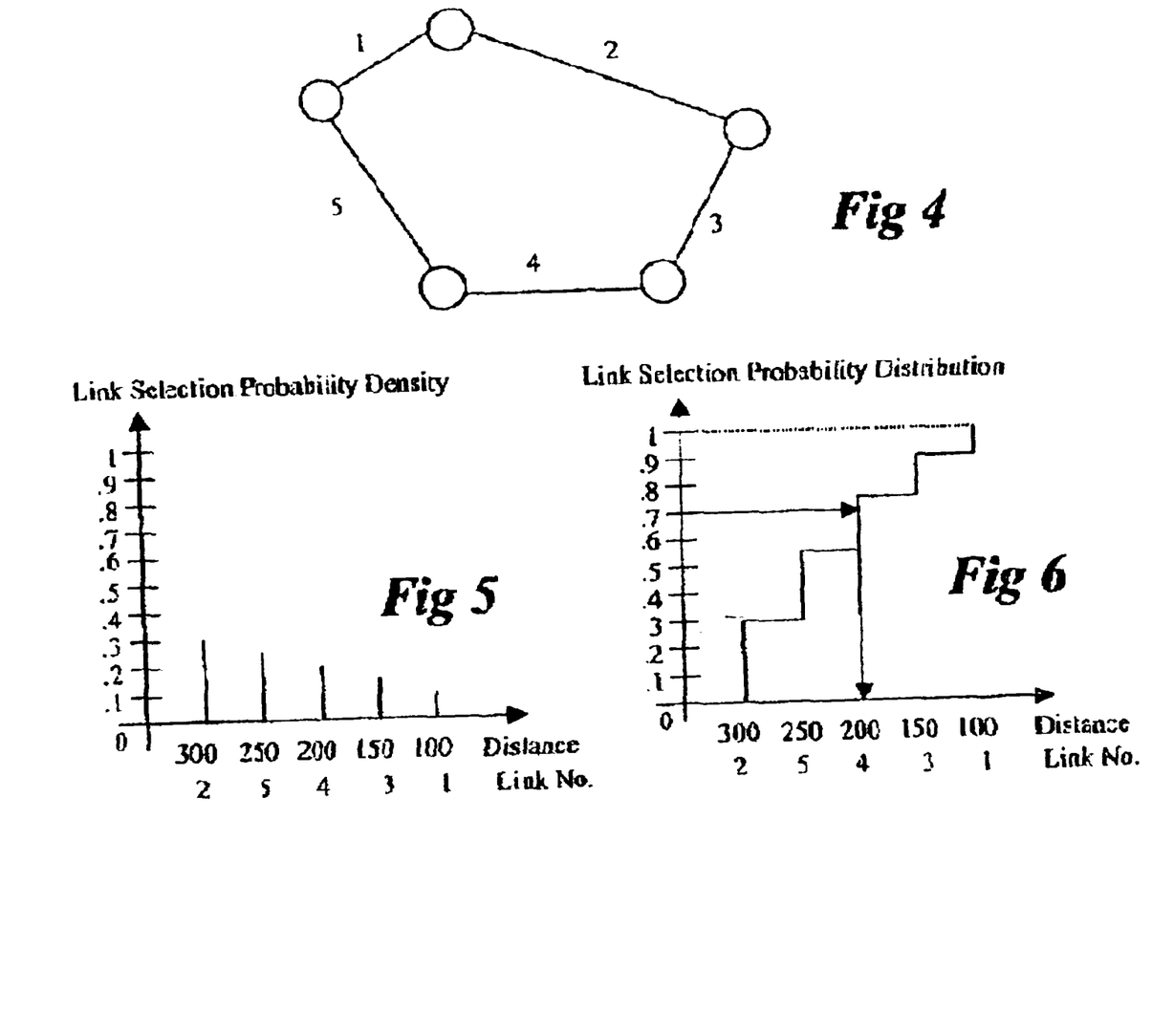
FIG. 4 shows a simple network for the purpose of illustrating the link selection aspect of the present invention.
FIG. 5 is a graph showing an example probability density of link selection.
FIG. 6 is a graph showing an example cumulative probability of link selection generated from FIG. 5.

To illustrate selection of links to fail, FIG. 4 shows a simple network with link parameters as follows:

| Link No. 1 | Distance di km | Probability of selection = di/TD |
|---|---|---|
| 1 | d1 = 100 | 0.1 |
| 2 | d2 = 300 | 0.3 |
| 3 | d3 = 150 | 0.15 |
| 4 | d4 = 200 | 0.2 |
| 5 | d5 = 250 | 0.25 |
| Total | TD = 1000 | 1 |

In the table above, link numbers and their distances are shown together with their distance-weighted probability of selection di/TD. FIG. 5 is a graph showing the probability density of link selection vs link distance. FIG. 6 shows the cumulative probability distribution of link selection derived from FIG. 5. (In FIGS. 5 and 6, the X-axis happens to show link distance ordered from longest to shortest, but this ordering is not necessary.) A uniform random number generator drives the link selection mechanism, that is, the generator generates a random number between 0 and 1 shown on the Y axis and selects a corresponding link shown on the X axis. For example, a random number of 0.7 would select link No. 4, as shown.

Although this is one way of selecting links to fail, other criteria can be considered per operator preference. For example, link infrastructure type (aerial versus buried) or location (city verses country) may be more critical to fiber cuts than just link distance. In such cases, more or less weight is given to such links and corresponding alternatives to FIGS. 5 and 6 can be used.

TTF (Time to Fail) Selection.

Figure 7:
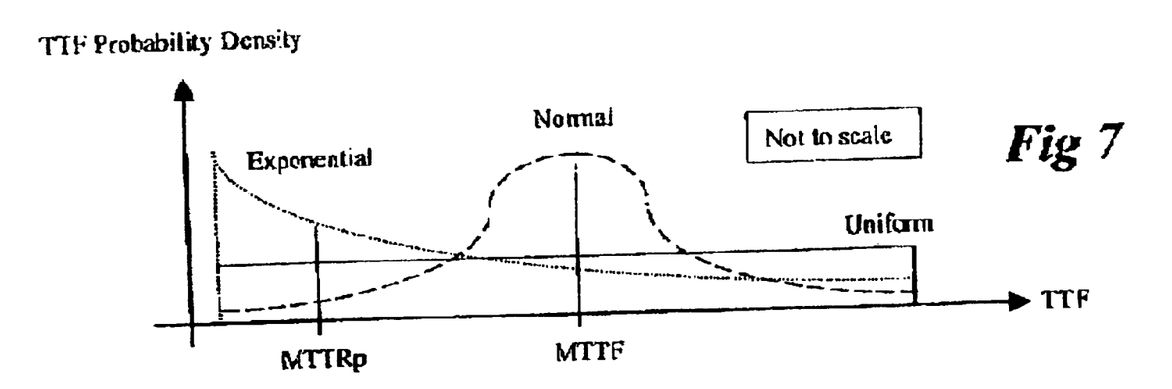
FIG. 7 shows example probability densities of TTF (time to failure).
Figure 8:
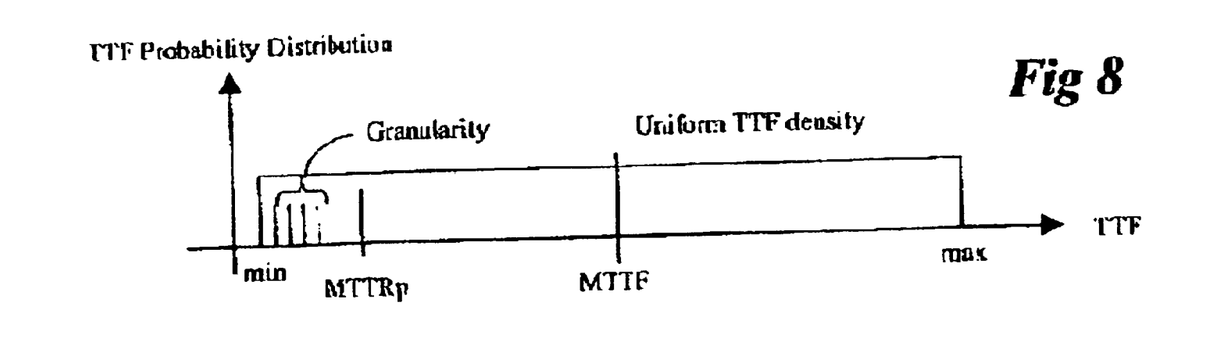
FIG. 8 is A uniform TTF probability density to illustrate details.

Like the link selection mechanism discussed above, a random number generator generates a random number, which selects a TTF from a TTF distribution with MTTF. Distributions are preferably based on operator experience, but can be any distribution per operator preference. Example TTF densities are uniform, normal, exponential, etc., as shown in FIG. 7. FIG. 8 shows a generalized uniform TTF density to explain some of the parameters in more detail. For fiber cuts, MTTF=1000/(F*di), where F is the average number of fiber cuts per year and di is the link fiber length in km. The uniform density ranges from "min" to "max", where "min">−0 and "max"=2MTTF−min<=2MTTF. The density on the Y-axis is determined by 1/(max−min)=1[2 (MTTF−min)]>=1/(2MTTF).

Another critical aspect of the TTF density is if times to failure can be smaller than times to repair TTRp. For TTF>TTRp, only single failure case will occur (as addressed at present), butt if TTF<TTRp, multiple failures can occur and have a relatively higher impact on availability (single and multiple failure cases were explained earlier). The granularity of TTF samples is preferably less than $\frac{1}{10}^{th}$ of minimum repair time. for reasonably accurate availability assessment during multiple failures (repair time selection is discussed later).

Figure 9:
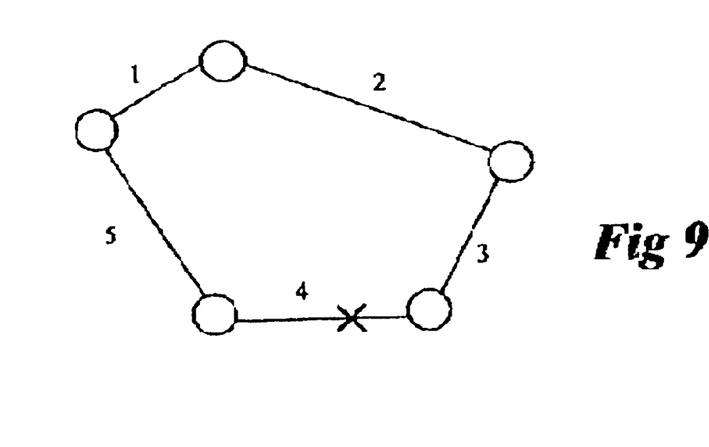
FIG. 9 shows a simple network for the purpose of illustrating the TTF aspect of the invention, similar to FIG. 4 except that is shows a fiber cut on link No. 4.
Figure 10:
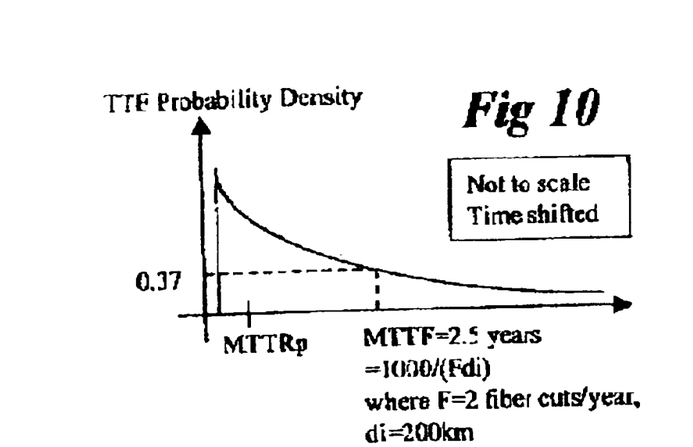
FIG. 10 is a graph showing an exponential TTF probability density.
Figure 11:
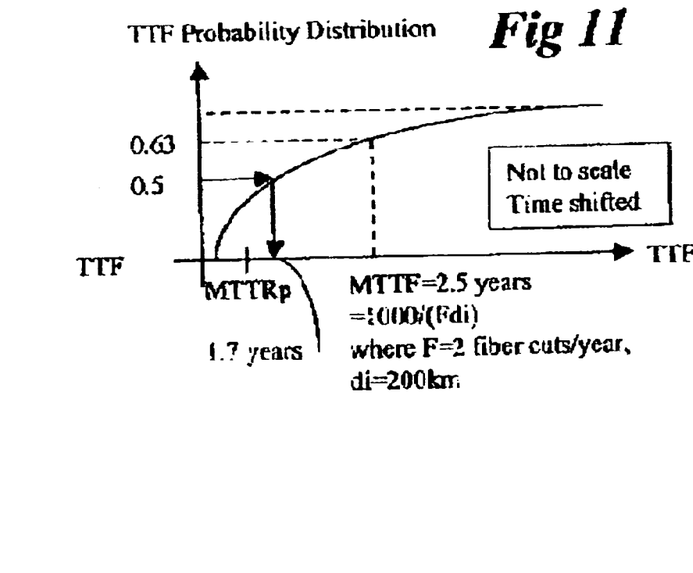
FIG. 11 is a graph showing cumulative probability distribution generated from FIG. 10.

Analogous to link selection discussed earlier, TTF densities are used for TTF selection as follows. FIG. 9 is the same network as in FIG. 4 except that it shows a failure in link No. 4. Links are assumed to have an exponential TTF density as shown in FIG 10. This density would approximately apply, for example, if an operator found that failures tended to bunch together in time. TTF is selected as follows. FIG. 11 is TTF cumulative probability distribution, corresponding to FIG. 10. In FIGS. 10 and 11, MTTF of link No, 4 is shown for reference. Link No. 4 has a distance of d4=200 km and has an average of F=2 fiber cuts per year. From MTTF=1000/(F*di), this translate to MTTF=2.5 years which corresponds to exponential probability of 0.63.

Like the selection mechanism for links, a uniform random number generator drives TTF selection. For example, in FIG. 11, a random number of 0.5 selects TTF−1.7 years for link No. 4.

As with link selection above, there may beneficial TTF distributions for different links under different conditions. The distribution for each link could be based on experience in term of infrastructure type (aerial, buried), type of right-of-way (beside railroad, in pipeline), location (city, country), provinces to construction activity or disasters (accidents, floods, earth quakes), etc.

Once the TTF value Is determined, a TTF counter is set to the TTF value and is decremented every clock increment. The selected link is considered to fail when the counter reaches 0.

TTRp (Time to Repair) Selection

Like the TTF selection mechanism above, a random number selects a value from a TTRp distribution with MTTRp. When a link failure occurs, a link TTRp counter is started with the selected TTRp value and then is decremented every clock increment until the counter reaches 0 at which time the link is considered repaired and is returned to the network for service. Note that in multiple failure cases, there may be more than one such counter running at any one time.

As with link and TTF selections above, in generating the TTRp distribution, or distributions, per operator preference it is possible to account for numerous effects, e.g., demographics, infrastructure, age of equipment, seasonal and time-to-day effects, work force, etc.

As noted earlier, fixed times to recover (TTRc) are used (since recovery times are very small compared to repair times).

It should be noted that FIG. 3 excludes details of clock increments and of setting, determining and tracking TTF and TTRp counters, etc.

Connection Selection

Here, for simplicity, all connections are randomly selected without replacement. This can be done using a uniform density and corresponding linear distribution of connections, together with a random number generator for selection, entirely similar to the other selection process already discussed above.

However, how connections are selected may effect availability results. For instance, under multiple failure conditions. Connections selected earlier have a better chance of recovering and of having higher availability than those selected later.

Thus, connections can be selected according to various criteria, per operator preference, that is: sequentially, randomly, with/without priority. (e.g., mission critical vs best effort traffic), all, or specific subset (e.g., reference connections), etc.

Figure 12:
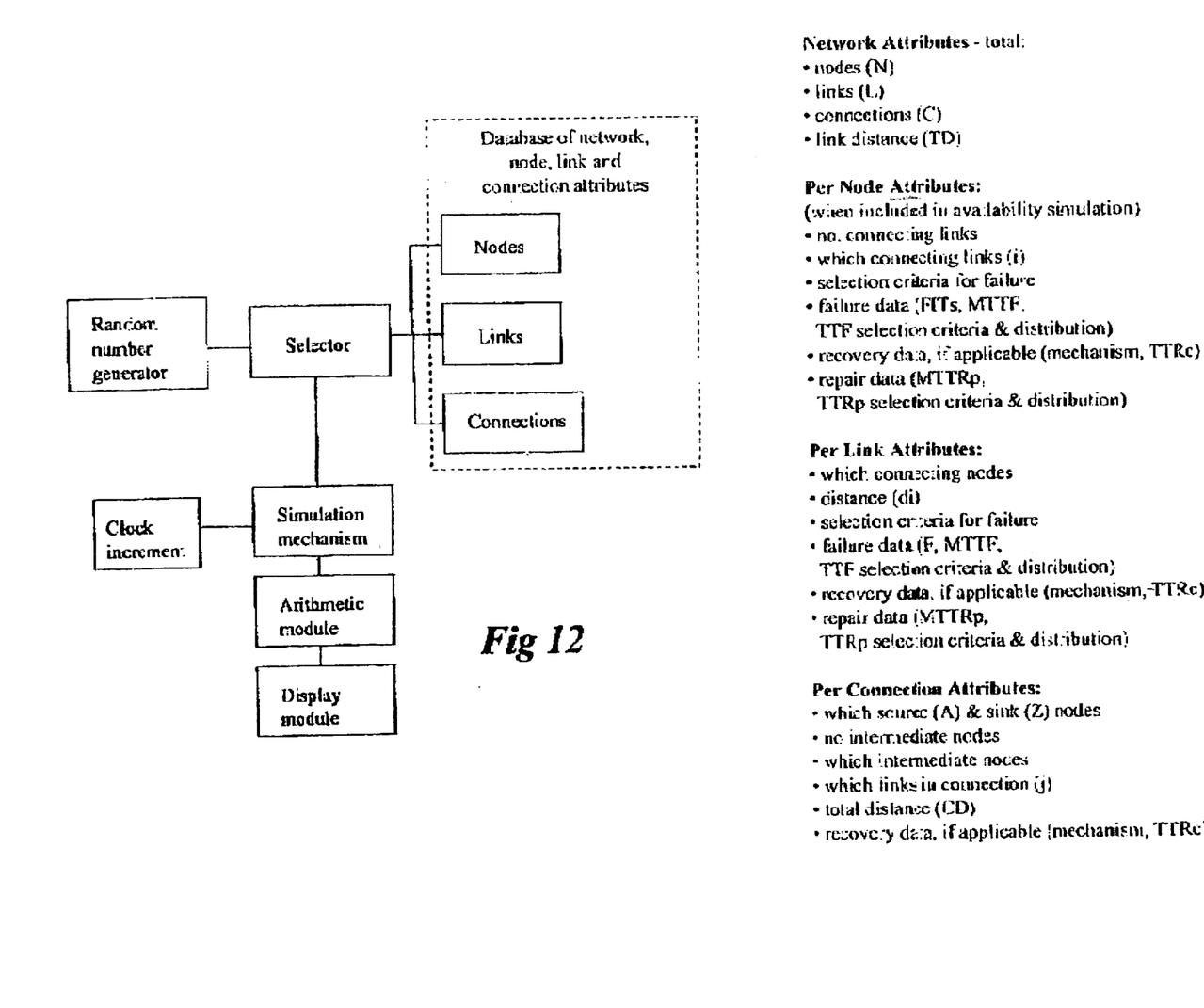
FIG. 12 is a schematic block diagram of the simulation technique according to one embodiment.

FIG. 12 is a block diagram of the simulation apparatus 100 according to one embodiment of the invention.

Referring to FIG. 12, a date 105 holds network data on the network, and on individual nodes, link and connections. As shown, the data identifies resources, and includes distances, selection criteria, failure, recovery and repair data, etc. A generator 110 generates random numbers by which a selector 120 selects links (and/or nodes) and their failures, and by which selected connections are affected or not, according to the stored data concerning link, node, and connection attributes. The link attributes includes the distance, TTF, TTRc, TTRp, etc. Once a link and a connection are selected, a simulation mechanism 115 performs simulated failure and restoration processes under the control of clock increments. The clock 125 generates clock increments, which are calibrated to correspond to a specific real time interval—for instance, one clock increment might be $1/1000^{th}$ of real time. An arithmetic module 130 calculates the availability or unavailability of the selected connection and thereafter the service availability of the network. Finally, the amiability is displayed an a display module 135.

Figures 13, 14:
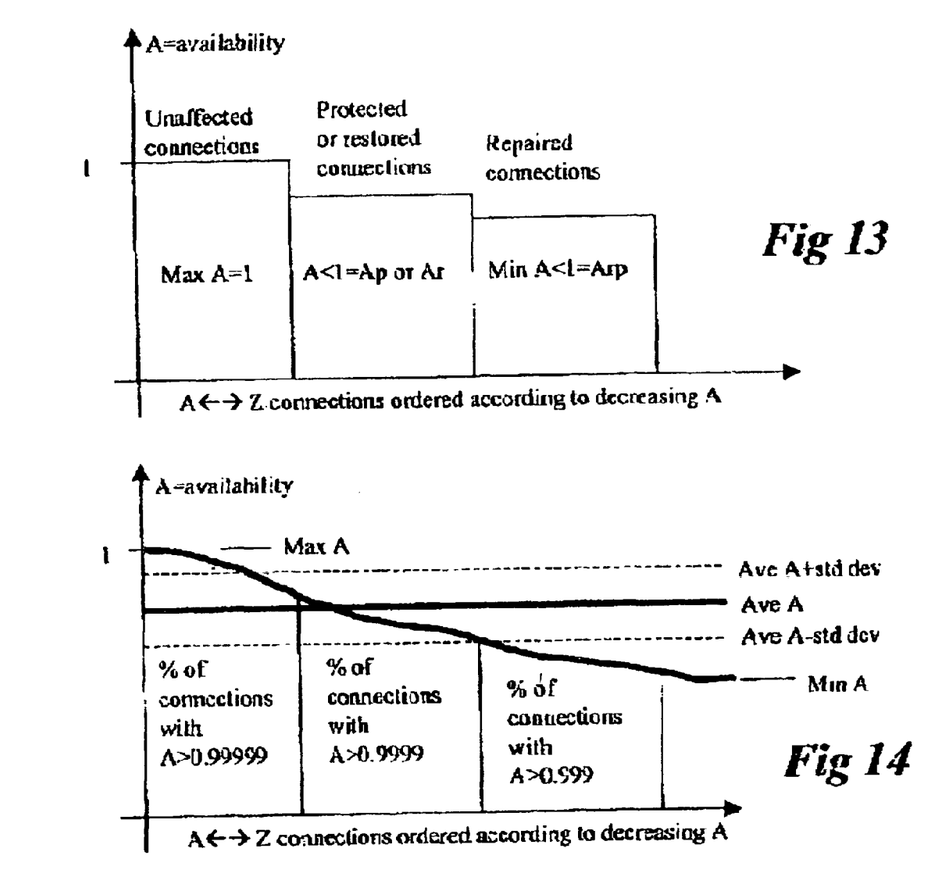
FIG. 13 is a hypothetical display of expected simulation results after one or very few link failures, according to an embodiment of the invention
FIG. 14 is a hypothetical display of expected results after most or all link failures, according to an embodiment of the invention

FIGS. 13 and 14 are hypothetical histograms of expected connection availability performance after the first few failures and after many failures, respectively. These results could be displayed on a display module. Over the simulation time, FIG. 13 migrates to FIG. 14, showing how each connection's availability is affected as more failures are encouraged. FIG. 14 is an example of what may be a useful way for simulation results to be summarized and presented to an operator. For example, the average availability is an indication of the overall network availability, and it would also be evident how many and which connection provide high availability (e.g., at least 99.999%), etc. However, specific connections and their availability are also identifiable on the X-axis, for example, connections known by the operator to carry critical services. Further, it could be made possible for the operator to select any such connection and get a log of its simulation details, e.g., as to the route it took, its distance, number of hops it went through, which failures affected it if recovery was successful, etc. While the invention has been described to what are presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A time simulation method of determining service availability of a communications network having a plurality of nodes and a plurality of links, comprising steps of:

(a) selecting a link between two network nodes;

(b) performing a simulated link failure on the selected link;

(c) selecting a connection between a network source node a network sink node;

(d) determining and summing the unavailability and availability of the selected connection under the simulated link failure condition;

(e) repeating steps (c), and (d) for all connections of the network; and (f) repeating steps (a) to (e) until either a link failure has been simulated on all links of the network or the summed availability has been determined to converge to a constant value, whichever is earlier.

2. The time simulation method according to claim 1, further comprising steps of:

averaging the service availability across all connections to generate the service availability of the network.

3. The time simulation method according to claim 1, wherein all steps are performed in response to clock increments, which proportionally correspond to actual times.

4. The time simulation method according to claim 1, the links of the communication network further having attributes in relation to failure, recovery and repair values, wherein the step of selecting a link further comprising:

randomly selecting a link based on the attributes of the links.

5. The time simulation method according to claim 4, wherein the attributes are in relation to their distance, time-to-failure parameter and time to recover/repair.

6. A computer program product, comprising:

a memory having computer-readable code embedded therein for determining service availability of a communications network having a plurality of nodes and a plurality of links comprising:

code means for selecting a link between two network nodes;

code means for performing a simulated link failure on the selected link;

code means for selecting a connection between a network source node and a network sink node;

code means for determining and summing the unavailability and availability of the selected connection under the simulated link failure condition;

code means for repeating steps (c), and (d) for all connections of the network; and code means for repeating steps (a) to (e) link failure has been simulated on all links of the network or the summed availability has been determined to converge to a constant value, whichever is earlier.

7. The computer program product according to claim 6, further comprising:

code means for averaging the service availability across all connections to generate the service availability of the network.

8. The computer program product according to claim 6, further comprising:

code means for randomly selecting a link based on the attributes of the links.

9. The computer program product according to claim 8, further comprising:

code means for randomly selecting a link based on distance, time-to-failure parameter and time-to-recover/repair.

* * * * *